US012780547B2

(12) United States Patent
Kiyokawa et al.

(10) Patent No.: US 12,780,547 B2
(45) Date of Patent: Nov. 3, 2026

(54) AUTOMATED WAREHOUSE

(71) Applicant: Daifuku Co., Ltd., Osaka (JP)

(72) Inventors: Wataru Kiyokawa, Tokyo (JP); Makoto Sakashita, Tokyo (JP); Shimon Katsura, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 339 days.

(21) Appl. No.: 18/420,129

(22) Filed: Jan. 23, 2024

(65) Prior Publication Data

US 2024/0246766 A1 Jul. 25, 2024

(30) Foreign Application Priority Data

Jan. 24, 2023 (JP) ................................ 2023-008631

(51) Int. Cl.
*B65G 1/137* (2006.01)

(52) U.S. Cl.
CPC .... *B65G 1/1371* (2013.01); *B65G 2203/0216* (2013.01); *B65G 2203/046* (2013.01)

(58) Field of Classification Search
CPC .......... B65G 1/1371; B65G 2203/0216; B65G 2203/046
See application file for complete search history.

(56) References Cited

U.S. PATENT DOCUMENTS

2009/0265031 A1 10/2009 Tachibana et al.

FOREIGN PATENT DOCUMENTS

| | | | | | |
|---|---|---|---|---|---|
| CN | 114590513 | A | * | 6/2022 | ........... B65G 1/1373 |
| EP | 1818285 | A1 | * | 8/2007 | ............. G06Q 10/08 |
| JP | 2006341957 | A | * | 12/2006 | |
| JP | 6908683 | B2 | * | 7/2021 | ............. B65G 1/137 |
| WO | 2008047545 | A1 | | 4/2008 | |

* cited by examiner

*Primary Examiner* — Justin Holmes
(74) *Attorney, Agent, or Firm* — The Webb Law Firm

(57) ABSTRACT

An automated warehouse includes a storage rack, at least one loading section where loading processing of loading a loading target article is performable, a transport apparatus, and a control unit. Each article includes a wireless tag in which identification information unique the article is recorded. The loading section includes a wireless tag reader configured to read the wireless tag. In the loading processing, the control unit reads, with the wireless tag reader, the wireless tag of the loading target article, and in response to the read identification information not matching any identification information of other articles already recorded in a recording unit, the control unit records the read identification information as the identification information of the loading target article in the recording unit.

9 Claims, 6 Drawing Sheets

| | |
|---|---|
| ARTICLE ID | KB497543 |
| | AI254812 |
| | OG981264 |
| | DK64752 |
| | IB024198 |
| | · |
| | · |
| | · |

AUTOMATED WAREHOUSE

CROSS-REFERENCE TO RELATED APPLICATION

This application claims priority to Japanese Patent Application No. 2023-008631 filed Jan. 24, 2023, the disclosure of which is hereby incorporated by reference in its entirety.

BACKGROUND OF THE INVENTION

1. Field of the Invention

The present invention relates to an automated warehouse including a storage rack that stores articles and a transport apparatus that transports articles.

2. Description of Related Art

An example of such an automated warehouse is disclosed in WO 2008/047545A (Patent Document 1). In the automated warehouse of Patent Document 1, the storage rack (warehouse unit 10*a*, 10*b*) is provided with a tag reader (information reading/writing means 14) at an access position for an article (carriage 60), and information of a tag (identification member 15 such as an ID tag) attached to the article is read by the tag reader. Thus, stored articles are managed based on the read information.

As tags attached to articles, wireless tags as mentioned in Patent Document 1 as the tags attached to the stored articles can be used in view of that they can be simultaneously read and are hardly affected by obstructions, for example.

However, in an automated warehouse in which multiple articles are stored in a storage rack, if a wireless tag whose reading range is relative long is used, a reader, when trying to perform reading processing on an article to be loaded, may mistakenly read information from a wireless tag attached to another article stored near this article. If such misreading occurs, the article that could not be correctly identified will be loaded, and thus accurate management of articles stored on the storage rack will be no longer possible. Although it is also conceivable, for example, to install a shield in order to reduce the likelihood of misreading, such a countermeasure may lead to complication of the facility configuration or a cost increase, and thus is not desirable.

SUMMARY OF THE INVENTION

Accordingly, in an automated warehouse configured to manage stored articles using wireless tags and wireless tag readers that read the wireless tags, it is desirable to achieve accurate management of the stored articles with a simple configuration.

The automated warehouse according to the present disclosure includes:

- a storage rack including a plurality of storage sections capable of storing articles;
- at least one loading section where loading processing, in which a loading target article among the articles is loaded to the storage rack, is performable;
- a transport apparatus configured to transport the loading target article from the loading section to any one of the storage sections; and
- a control unit configured to perform the loading processing and control the transport apparatus,
- wherein each of the articles includes a wireless tag in which identification information unique to the article is recorded,
- the loading section includes a wireless tag reader configured to read the wireless tag,
- the loading processing includes reading processing of reading, with the wireless tag reader, the identification information recorded in the wireless tag of the loading target article,
- the automated warehouse further comprises a recording unit in which the identification information of the articles is recorded, and
- in the loading processing, in response to the identification information read in the reading processing not matching any recorded identification information of other articles already recorded in the recording unit, the control unit records the identification information read in the reading processing as the identification information of the loading target article in the recording unit.

With this configuration, even if, for example, the loading section and the storage section are located at a short distance, and the wireless tag reader installed in the loading section mistakenly reads identification information recorded in a wireless tag of an article that is stored in the storage section and is different from the loading target article, it is possible to avoid the false identification information from being recorded as the identification information of the loading target article. That is to say, the true identification information of the loading target article can be recorded, by a simple method of performing filtering by comparing the identification information with the recorded identification information already recorded in the recording unit. Accordingly, it is possible to realize an automated warehouse that can accurately manage stored articles with a simple configuration.

Further features and advantages of the technique according to the present disclosure will become more apparent from the following description of exemplary and non-limiting embodiments given with reference to the drawings.

BRIEF DESCRIPTION OF THE DRAWINGS

The terms Fig., FIG., Figs., FIGS., Figure, and Figures are used interchangeably in the specification to refer to the corresponding figures in the drawings.

DESCRIPTION OF THE INVENTION

Figure 1:
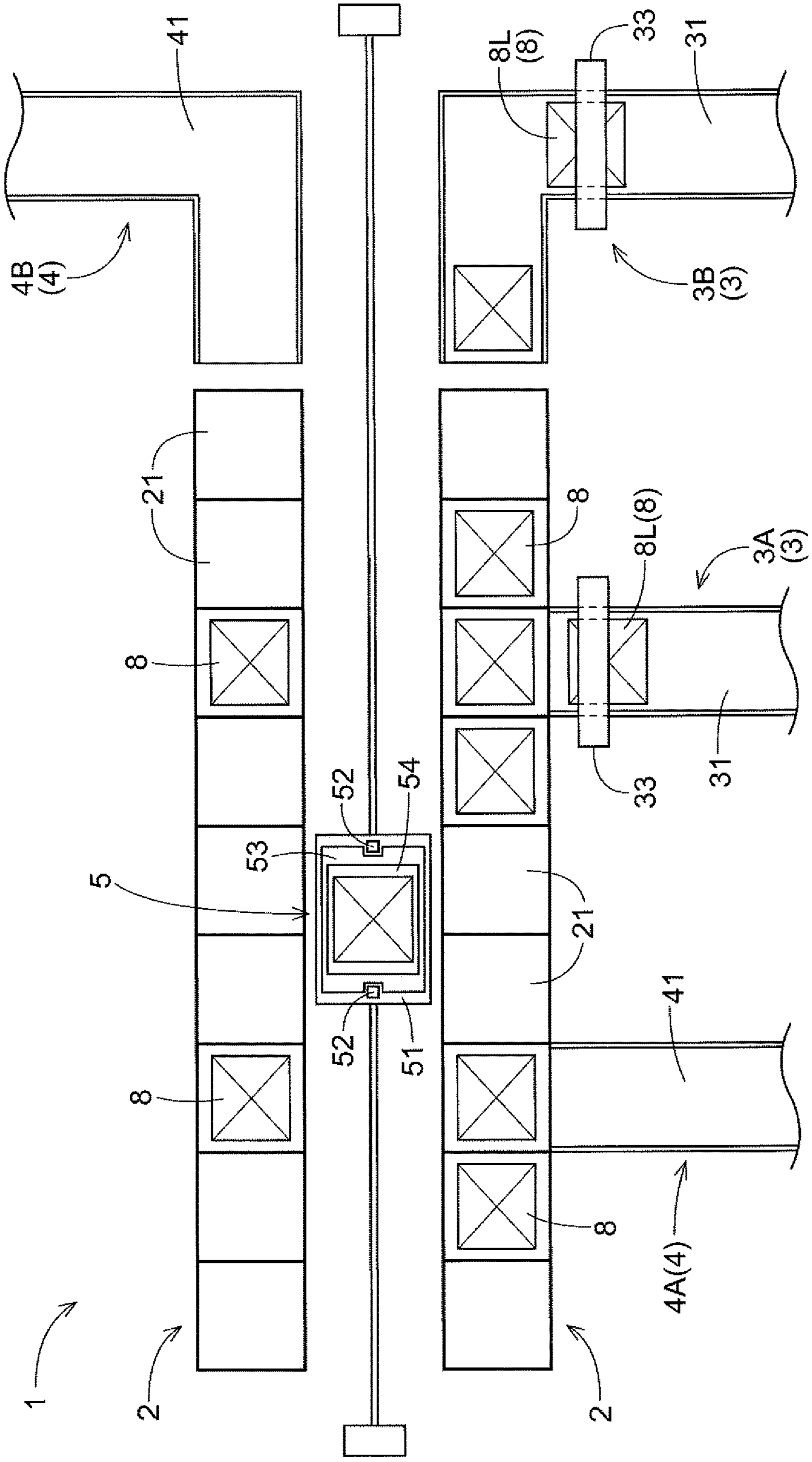
FIG. 1 is a plan view illustrating an automated warehouse according to an embodiment.
Figure 2:
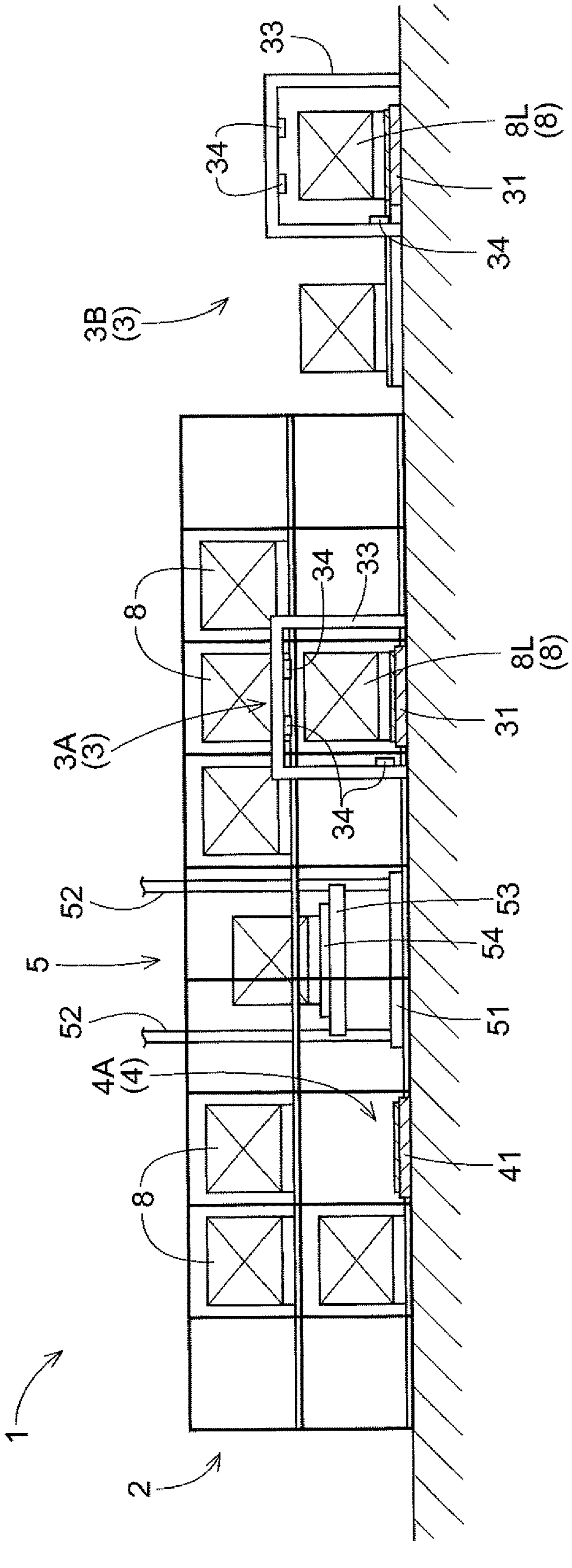
FIG. 2 is a front view illustrating the automated warehouse.
Figure 5:
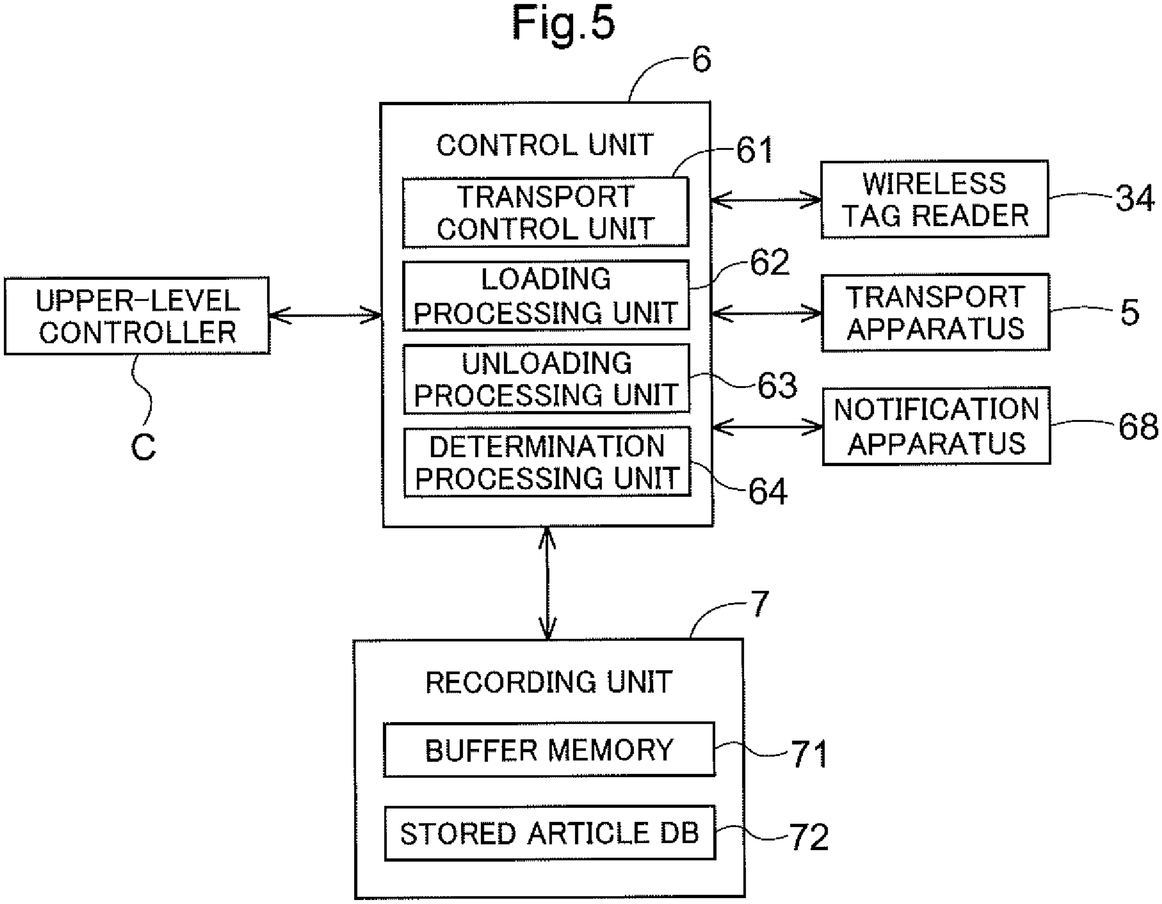
FIG. 5 is a schematic diagram illustrating a control system.

An embodiment of the automated warehouse is described with reference to the drawings. An automated warehouse 1 of the present embodiment is used to efficiently store and transport (introduce and discharge) articles 8 in, for example, a factory, a distribution center and the like. As shown in FIGS. 1 and 2, the automated warehouse 1 of the present embodiment includes a storage rack 2, a loading section 3, and an unloading section 4, and a transport apparatus 5. The automated warehouse 1 also includes, as shown in FIG. 5, a control unit 6 and a recording unit 7.

The storage rack 2 includes a plurality of storage sections 21 capable of storing the articles 8. The storage rack 2 includes the plurality of storage sections 21 arranged in a plurality of rows and a plurality of columns. In the present embodiment, the automated warehouse 1 includes a plurality of (two in the shown example) such storage racks 2, and the two storage racks 2 are disposed facing each other with the transport apparatus 5 interposed therebetween. Note that the number of the storage racks 2 included in the automated warehouse 1 is not limited to this, and may be one, or three or more.

Figure 3:
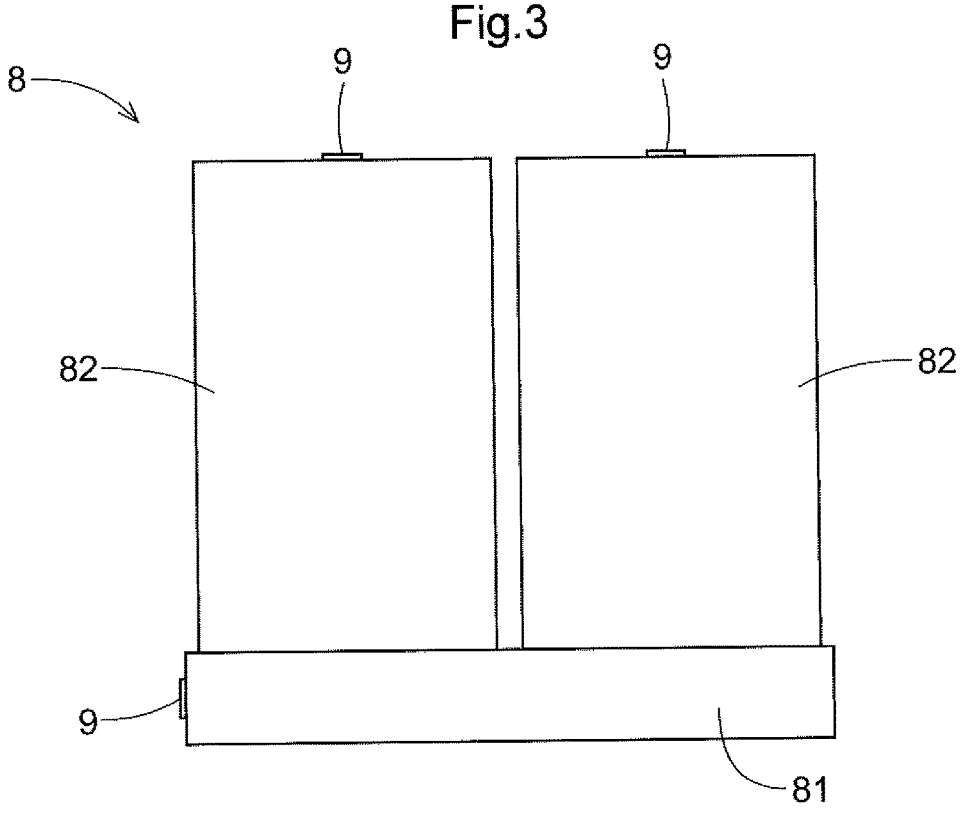
FIG. 3 is a front view illustrating an article.
Figure 4:
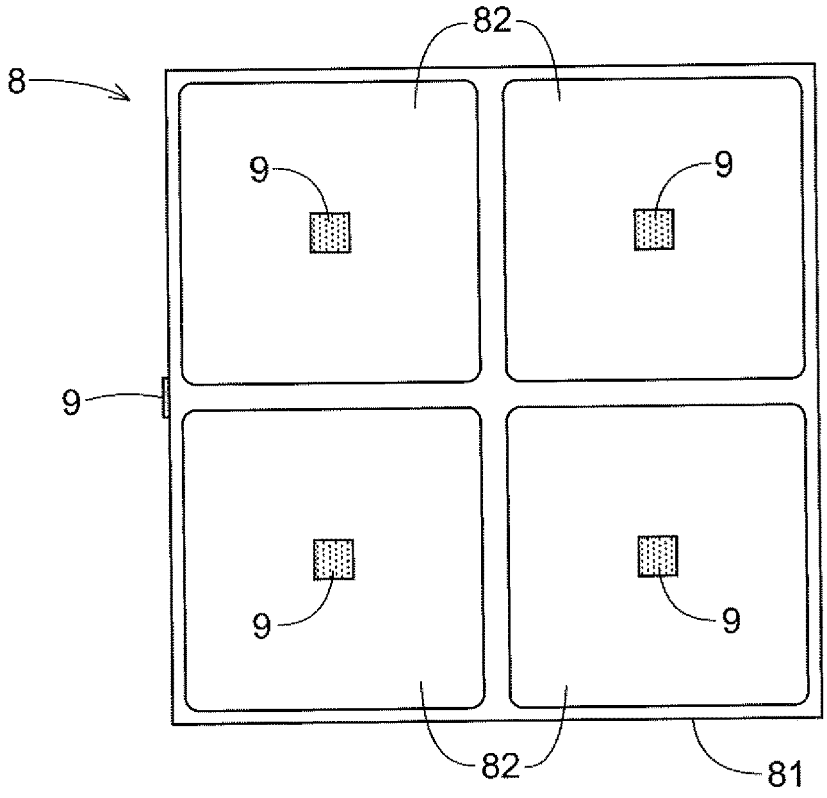
FIG. 4 is a plan view illustrating the article.

As shown in FIGS. 3 and 4, the articles 8 of the present embodiment each include a pallet 81 and loads 82 placed on the pallet 81. In the shown example, total four loads 82 are placed on the pallet 81 in an array of two vertical columns and two rows. Each load 82 may be laid bare or stored in a separate container. In the latter case, the term "load 82" includes a container that stores the load.

Figure 6:
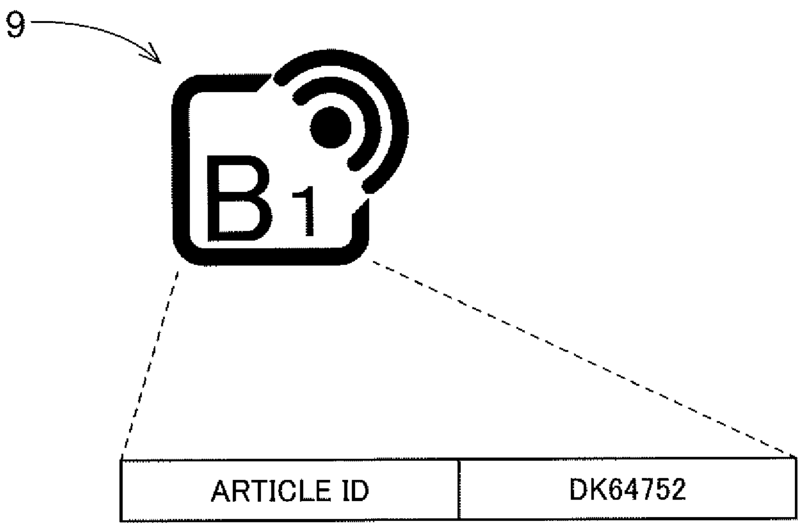
FIG. 6 is a schematic diagram illustrating information recorded in a wireless tag.

In the present embodiment, the article 8 has wireless tags 9 attached thereto. The wireless tags 9 are tags in and from which information can be written and read using wireless communication. As the wireless tags 9, any type of wireless tags may be used such as passive-type, active-type or semi active-type wireless tags. In the present embodiment, passive-type RFIDs (Radio Frequency Identification) are used as the wireless tags 9. Also, RFIDs of various types of frequency bands such as, for example, UHF band RFIDs and HF band RFIDs may be used as the RFIDs. As shown in FIG. 6, a wireless tag 9 has recorded therein identification information (article ID) unique to an article 8 to which the wireless tag 9 is attached.

In the present embodiment, a wireless tag 9 is attached to each of the pallet 81 and the load 82 (or loads 82 if there are a plurality of loads 82) constituting an article 8. In the present embodiment, a wireless tag 9 is attached to a side face of the pallet 81, and wireless tags 9 are attached to the upper faces of the loads 82.

In such a case, information recorded on a wireless tag 9 is identification information (pallet ID) unique to the pallet 81 to which the wireless tag 9 is attached, or identification information (load ID) unique to the load 82 to which the wireless tag 9 is attached. In this case, the identification information (pallet ID) unique to the pallet 81 may be used as identification information (article ID) unique to the article 8, or a combination of the identification information (pallet ID) unique to the pallet 81 and the identification information (load ID) unique to the loads 82 placed thereon may be understood as the identification information (article ID) unique to the article 8.

The following will describe, for ease of description, a configuration in which the identification information (pallet ID) unique to the pallet 81 is used as the identification information (article ID) unique to the article 8, as an example.

The loading section 3 is a section where loading processing of loading an article 8 to be loaded (hereinafter, referred to as "loading target article 8L") to the storage rack 2 is performed. As shown in FIGS. 1 and 2, the loading section 3 includes an introduction path 31 for introducing the loading target article 8L toward the storage rack 2. The introduction path 31 may be straight, or may have a curved zone, an L-shaped path, and the like. The introduction path 31 extends to the vicinity of the storage rack 2.

In the present embodiment, the automated warehouse 1 includes a plurality of such loading sections 3, and in the shown example, the automated warehouse 1 includes two loading sections 3. A first loading section 3A, which is one of the two loading sections 3, is connected to one of the plurality of storage sections 21 of the storage rack 2. A second loading section 3B, which is the other one of the two loading sections 3, extends to a position adjacent to the storage rack 2 in a direction in which the rows of the storage rack 2 are aligned. Each of the introduction paths 31 of the first loading section 3A and the second loading section 3B has, at a position in front of the storage rack 2, a gate 33 through which the loading target article 8L conveyed on the introduction path 31 is passed.

As shown in FIG. 2, the gate 33 includes a wireless tag reader 34 fixed thereto. The wireless tag reader 34 reads a wireless tag 9 attached to the loading target article 8L. In the present embodiment, the wireless tag reader 34 is an antenna that reads an RFID serving as the wireless tag 9.

In the present embodiment, for each gate 33, a plurality of such wireless tag readers 34 are provided so as to be located at positions above and lateral to the loading target article 8L that is being conveyed on the introduction path 31. More specifically, for each gate 33, two wireless tag readers 34 are provided so as to be located at positions above the loading target articles 8L, and one wireless tag reader 34 is provided so as to be located at a position lateral to the loading target article 8L. The two wireless tag readers 34 provided in the upper part mainly read the wireless tags 9 attached to the upper faces of the loads 82. The one wireless tag reader 34 provided in the lateral part reads the wireless tag 9 attached to the side face of the pallet 81. In this way, the loading processing performed in the loading section 3 includes reading processing of reading, using the wireless tag readers 34, identification information recorded in the wireless tags 9 of the loading target article 8L.

Meanwhile, as described above, in the present embodiment, the first loading section 3A is connected to one of the plurality of storage sections 21 of the storage rack 2. Accordingly, the distance between the gate 33 provided in the vicinity of a downstream-side end of the introduction path 31 of the first loading section 3A and the storage section 21 adjacent thereto is significantly small. The distance between the two components is less than a predetermined specified distance, and in the present embodiment, the distance is smaller than a distance larger than the maximum value of a communicable distance (hereinafter, referred to as "maximum communicable distance") between the wireless tag 9 and the wireless tag reader 34.

Note that the maximum communicable distance between the wireless tag 9 and the wireless tag reader 34 is, for example, about 5 m to 10 m when an UHF band RFID is used as the wireless tag 9, and is, for example, about 10 cm to 15 cm when an HF band RFID is used as the wireless tag 9. The specified distance can be set to a length obtained by adding a predetermined margin (about 1% to 10%, for example) to the maximum communicable distance. In the present embodiment, the first loading section 3A corresponds to a "nearby loading section".

Also, in the present embodiment, the second loading section 3B extends to a position adjacent to the storage rack 2 in a direction in which the rows of the storage rack 2 are aligned. The distance between the gate 33 provided on the downstream side of the introduction path 31 of the second loading section 3B and the storage section 21 closest thereto is relatively large. The distance between the two components is larger than or equal to the predetermined specified distance, and in the present embodiment, the distance is larger than or equal to the distance larger than the maximum communicable distance between the wireless tag 9 and the wireless tag reader 34. In the present embodiment, the second loading section 3B corresponds to a "distant loading section".

The unloading section 4 is a section where unloading processing of unloading an article 8 to be unloaded (hereinafter, referred to as "unloading target article") from the storage rack 2 is performed. As shown in FIG. 1, the unloading section 4 includes a discharge path 41 for discharging the unloading target article from the storage rack 2. The discharge path 41 may be straight, or may have a curved zone, an L-shaped path, and the like. The discharge path 41 extends from the vicinity of the storage rack 2.

In the present embodiment, the automated warehouse 1 includes a plurality of such unloading sections 4, and in the shown example, the automated warehouse 1 includes two unloading sections 4. A first unloading section 4A, which is one of the two unloading sections 4, is connected to one of the plurality of storage sections 21 of the storage rack 2. A second unloading section 4B, which is the other one of the two unloading sections 4, extends from a position adjacent to the storage rack 2 in the direction in which the rows of the storage rack 2 are aligned.

The transport apparatus 5 transports a loading target article 8L from the loading section 3 to any one of the storage sections 21, and transports an article 8 (unloading target article) from any one of the storage sections 21 to the unloading section 4. The transport apparatus 5 of the present embodiment is configured as a stacker crane, and includes a traveling carriage 51, a set of masts 52, a lift platform 53, and a transfer apparatus 54. The traveling carriage 51 travels on a travel rail laid on the floor surface between the pair of storage racks 2. The set of masts 52 includes two masts 52 standing upright from the traveling carriage 51. The lift platform 53 moves up and down along the set of masts 52. The transfer apparatus 54 is fixed to the lift platform 53 and transfers the article 8.

The control unit 6 performs the loading processing, the unloading processing, control on the transport apparatus 5, and the like. As shown in FIG. 5, the control unit 6 of the present embodiment includes a transport control unit 61, a loading processing unit 62, an unloading processing unit 63, and a determination processing unit 64. These components are configured in a manner such that their functional units for performing various types of processing on input data are implemented by either or both of hardware and software (program) with a common or independent arithmetic processing unit such as CPU serving as a core member. The functional units 61 to 64 are configured to be able to exchange information with each other. Also, the control unit 6 is communicably connected to an upper-level controller C, the wireless tag readers 34, the transport apparatus 5, a notification apparatus 68, and a recording unit 7.

The upper-level controller C performs comprehensive control of the storage status, transport state and the like of articles 8 in the entire facility including the automated warehouse 1. For example, the upper-level controller C recognizes the type and number of articles 8 stored and maintained on the storage racks 2, the type and number of articles 8 (loading target articles 8L) to be introduced into the storage racks 2, and the type and number of articles 8 (unloading target articles) to be discharged from the storage racks 2. Also, the upper-level controller C recognizes, for example, changes in stock of the articles 8 through new production, introduction from the outside, and discharge to the outside.

The upper-level controller C has stored therein the identification information recorded in the wireless tags 9 attached to articles 8 and attribute information (such as, e.g., type, number, weight, and expiration date) relating to the articles 8, in association with each other. By managing the identification information of the wireless tags 9 attached to the articles 8, the upper-level controller C manages the type and number of the articles 8 based on the identification information.

Figure 7:
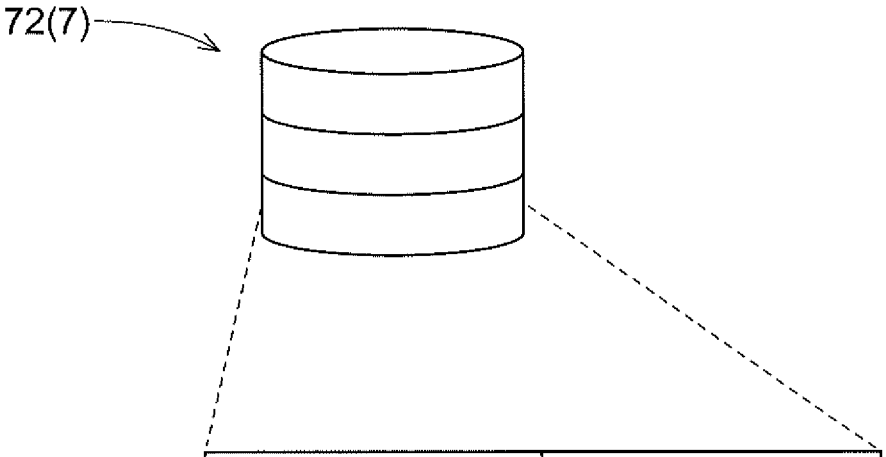
FIG. 7 is a schematic diagram illustrating information recorded in a recording unit.

The recording unit 7 includes, as a hardware configuration, a recording medium capable of storing and rewriting information, such as a hard disk drive or a flash memory, for example. The pieces of identification information of articles 8 are recorded in the recording unit 7. As shown in FIG. 5, the recording unit 7 of the present embodiment includes a buffer memory 71 and a stored article database (indicated as "stored article DB" in FIG. 5) 72. The buffer memory 71 temporarily records identification information of an article 8. As shown in FIG. 7, the stored article database 72 has recorded therein identification information (article ID) of articles 8 already stored in the storage racks 2.

The transport control unit 61 controls operations of the transport apparatus 5. The transport control unit 61 controls the operations of the traveling carriage 51, the lift platform 53, and the transfer apparatus 54 to transport a loading target article 8L from the loading section 3 (the first loading section 3A or the second loading section 3B) to any one of the storage sections 21. Also, the transport control unit 61 controls the operations of the traveling carriage 51, the lift platform 53, and the transfer apparatus 54 to transport an article 8 from any one of the storage sections 21 to the unloading section 4 (the first unloading section 4A or the second unloading section 4B). The transport control unit 61 may also control the operations of the traveling carriage 51, the lift platform 53, and the transfer apparatus 54 to transport an article 8 between two different storage sections 21.

The loading processing unit 62 performs the loading processing. The loading processing unit 62 performs, as the loading processing, processing of recording the identification information unique to the loading target article 8L in the recording unit 7. Also, in the present embodiment, the loading processing includes reading processing of reading, using the wireless tag reader 34, the identification information recorded in the wireless tags 9 of the loading target article 8L. In the reading processing, which is part of the loading processing, the loading processing unit 62 temporarily records the identification information (article ID) unique to the loading target article 8L read by the wireless tag reader 34 in the buffer memory 71. Note that the identification information of the loading target article 8L temporarily recorded in the buffer memory 71 is recorded (added) to the stored article database 72 at a stage at which the loading target article 8L is completely stored in the target storage section 21, under a given condition.

The unloading processing unit 63 performs the unloading processing. The unloading processing unit 63 performs, as the unloading processing, processing of disabling the identification information unique to an article 8 (unloading target article) to be discharged from the storage rack 2. In the present embodiment, by deleting the identification information of the unloading target article from the stored article database 72, the unloading processing unit 63 eliminates and disables the identification information from the recording unit 7.

The determination processing unit 64 performs determination processing of determining whether or not to record the identification information of the loading target article 8L temporarily recorded in the buffer memory 71 in the loading processing, in the stored article database 72. In the present embodiment, in at least the first loading section 3A of the plurality of loading sections 3, the distance between the gate 33 provided in the introduction path 31 of the first loading section 3A and the storage section 21 adjacent thereto is significantly small. Accordingly, when a wireless tag reader 34 provided on the gate 33 tries to read identification information recorded on the corresponding wireless tag 9 of the loading target article 8L, there may be cases where the wireless tag reader 34 reads identification information of an article 8 already stored in the nearby storage section 21. Therefore, the determination processing unit 64 determines whether or not the identification information of the loading target article 8L read by the wireless tag reader 34 and temporarily recorded in the buffer memory 71 is true.

The determination processing unit 64 of the present embodiment determines whether or not the identification information of the loading target article 8L temporarily recorded in the buffer memory 71 is true, particularly in the loading processing that is performed in the first loading section 3A in which the distance between the gate 33 and the storage section 21 closest thereto is smaller than the specified distance (more specifically, smaller than a distance larger than the maximum communicable distance between the wireless tag 9 and the wireless tag reader 34). Note that the determination processing unit 64 does not perform the above-described truth determination in the loading processing that is performed in the second loading section 3B in which the distance between the gate 33 and the storage section 21 closest thereto is larger than or equal to the specified distance.

In the loading processing that is performed in the first loading section 3A, the determination processing unit 64 determines whether or not the identification information of the loading target article 8L read in the reading processing matches any identification information of other articles 8 already recorded in the stored article database 72 of the recording unit 7. The determination processing unit 64 performs the matching determination, by sequentially comparing the read identification information of the loading target article 8L with identification information of any other articles 8 already recorded in the stored article database 72 to determine whether or not there is a pair of matched identification information.

The matching determination is executed repeatedly until it is determined that the identification information in question matches identification information of another article 8, or it is determined that the identification information in question does not match identification information of any other articles 8. When the matching determination is complete, the determination processing unit 64 notifies the loading processing unit 62 of information relating to the result of the matching determination.

If the loading processing unit 62 receives information of "there is no matching information" from the determination processing unit 64, the loading processing unit 62 records the identification information of the loading target article 8L temporarily recorded in the buffer memory 71 as true information in the stored article database 72. Note that the loading processing unit 62 records the identification information of the loading target article 8L in the stored article database 72 at a stage at which the loading target article 8L is completely stored in the target storage section 21.

On the other hand, if the loading processing unit 62 receives information of "there is matching information" from the determination processing unit 64, the loading processing unit 62 regards the identification information of the loading target article 8L temporarily recorded in the buffer memory 71 as false information, and does not record it in the stored article database 72. In this case, the loading processing unit 62 interrupts the loading processing and performs abnormality notification via the notification apparatus 68. Here, the notification apparatus 68 is, for example, a monitor, a speaker, or the like. The loading processing unit 62 displays a message indicating an abnormality has occurred, on the monitor, which is the notification apparatus 68, or performs audio assist (or simply giving a warning tone) speaking that an abnormality has occurred, from the speaker, which is the notification apparatus 68.

Upon receiving the notification from the notification apparatus 68, an operator can take measures of re-reading the wireless tag 9, for example. In the matching determination after the re-reading, if it is determined repeatedly a predetermined number of times or more that "there is matching information", the loading processing unit 62 may raise the notification level by, for example, displaying the message in a blinking manner on the monitor, which is the notification apparatus 68, or performing the audio assist at a large volume from the speaker, which is the notification apparatus 68.

Also, if the automated warehouse 1 is provided with an anechoic chamber, a configuration is possible in which, upon receiving an abnormality notification, the loading target article 8L is transported to the anechoic chamber and then the wireless tag 9 is reread.

As described above, the determination processing unit 64 does not perform any matching determination in the loading processing that is performed in the second loading section 3B. Since in the second loading section 3B, the distance between the gate 33 and the storage section 21 closest thereto is larger than or equal to the specified distance (more specifically, larger than or equal to a distance larger than the maximum communicable distance between the wireless tag 9 and the wireless tag reader 34), there is substantially no possibility that misreading occurs. Accordingly, the determination processing unit 64 regards the situation as having "no matching information" without performing matching determination, and notifies the loading processing unit 62 of information indicating the situation. The processing of the loading processing unit 62 after having received the information of "there is no matching information" is as described above.

Figure 8:
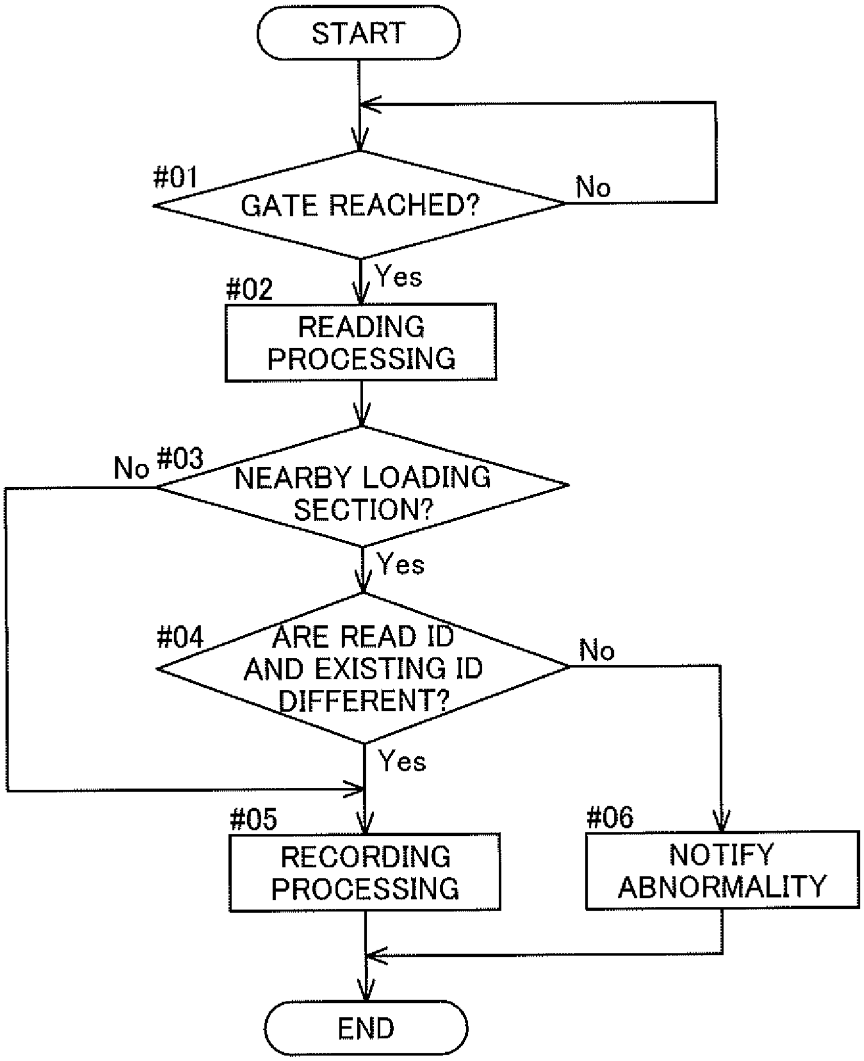
FIG. 8 is a flowchart illustrating a flow of processing when an article is to be loaded.

Hereinafter, the flow of processing when an article 8 is to be loaded will be described with reference to the flowchart of FIG. 8. First, when a loading target article 8L has reached the gate 33 of the loading section 3 (Yes in step #01), the loading processing unit 62 executes reading processing (step #02). Then, it is determined whether or not the loading section 3 having the gate 33 at which the reading processing is executed is the first loading section 3A, which serves as the nearby loading section (step #03). If it is determined that the loading section 3 is the nearby loading section (first loading section 3A) (Yes in step #03), the determination processing unit 64 determines whether or not the identification information of the loading target article 8L read in the reading processing (indicated as "read ID" in FIG. 8) matches any identification information of other articles 8 already recorded in the stored article database 72 (indicated as "existing ID" in FIG. 8) (step #04).

In the determination processing, if it is determined that "there is no matching information" (Yes in step #04), the loading processing unit 62 records the identification information of the loading target article 8L read in the reading processing in the stored article database 72 (step #05), after the loading target article 8L has been completely loaded. On the other hand, if it is determined that "there is matching information" (No in step #04), the notification apparatus 68 performs abnormality notification (step #06).

Note that if the loading section 3 with the gate 33 at which the reading processing is executed is the second loading section 3B, which serves as the distant loading section (No in step #03), the loading processing unit 62 records as-is the read identification information of the loading target article 8L in the stored article database 72, after the loading target article 8L has been completely loaded (step #05), without performing determination processing in step #04.

Other Embodiments (1) The foregoing embodiment has described, as an example, a configuration in which, in the unloading processing, identification information unique to an article 8 (unloading target article) to be unloaded from the storage rack 2 is deleted from the stored article database 72. However, the present invention is not limited to this configuration, and a configuration is also possible in which, for example, the identification information itself of the unloading target article is left in the stored article database 72, and identification information of the unloading target article is disabled by processing of setting an invalid flag, or the like.

(2) The foregoing embodiment has described, as an example, a configuration in which matching determination is executed only in the loading processing that is executed in the first loading section 3A, serving as the nearby loading section, and matching determination is not executed in the loading processing that is executed in the second loading section 3B, serving as the distant loading section. However, the present invention is not limited to this configuration, and matching determination may be executed in loading processing executed in all the loading sections 3 regardless of whether it is the nearby loading section or the distant loading section.

(3) The foregoing embodiment has described, as an example, a configuration in which the specified distance based on which the nearby loading section and the distant loading section are distinguished is set to a distance larger than the maximum communicable distance between the wireless tag 9 and the wireless tag reader 34. However, the present invention is not limited to this configuration, and the specified distance may be set to, for example, the maximum communicable distance, or may be set to a distance slightly less than the maximum communicable distance.

(4) The foregoing embodiment has described, as an example, a configuration in which the nearby loading section and the distant loading section are distinguished from each other based on the magnitude relative to the predetermined specified distance. However, the present invention is not limited to this configuration, and the nearby loading section and the distant loading section may be distinguished from each other based on the crude positional relationship to the storage sections 21 included in the storage rack 2. For example, if the storage section 21 to which the introduction path 31 is connected is adjacent to another storage section 21 at total three positions, namely, on both sides in the width direction thereof and the upper or lower side, this loading section 3 having the introduction path 31 may be defined as the nearby loading section, and the other loading section 3 may be defined as the distant loading section. Alternatively, if the storage section 21 to which the introduction path 31 is connected is adjacent to another storage section 21 at any two positions among the upper, lower, left and right sides thereof, this loading section 3 having the introduction path 31 may be defined as the nearby loading section, and the other loading section 3 may be defined as the distant loading section. Alternatively, if the storage section 21 to which the introduction path 31 is connected is adjacent to another storage section 21 at only one position among the upper and lower sides thereof, this loading section 3 having the introduction path 31 may be defined as the nearby loading section, and the other loading section 3 may be defined as the distant loading section. That is to say, the loading section 3 having the introduction path 31 disposed in an area inside the storage rack 2 that is adjacent to at least one of the storage sections 21 may be defined as the nearby loading section.

(5) The foregoing embodiment has described, as an example, a configuration in which matching determination is performed based on the identification information of all of the articles 8 recorded in the stored article database 72. However, the present invention is not limited to this configuration, and matching determination may be performed only based on articles 8 located in the vicinity of the loading section 3 (gate 33), among the identification information of the articles 8 recorded in the stored article database 72. For example, matching determination may be performed only based on articles 8 located at distances less than a predetermined specified distance from the loading section 3. In this case, the specified distance can be set similarly to the foregoing embodiment. When such a configuration is employed, it is preferable that position information indicating the positions of the articles 8 already stored in the storage rack 2 be recorded, in association with the identification information of the articles 8, in the recording unit 7 (stored article database 72).

(6) The foregoing embodiment has described, as an example, a configuration in which matching determination is performed only based on the identification information of articles 8 already recorded in the stored article database 72. However, the present invention is not limited to this configuration, and identification information of articles 8 to be soon loaded may be included in the comparison targets for matching determination. To do so, it is sufficient that matching determination is performed based on a combination of the identification information recorded in the stored article database 72 and the identification information temporarily recorded in the buffer memory 71.

(7) The foregoing embodiment has described, as an example, a configuration in which the plurality of loading sections 3 are distanced from each other by a distance significantly larger than the specified distance. However, the present invention is not limited to this configuration, and depending on the environment in which the automated warehouse 1 is installed, two or more of the loading sections 3 may be provided close to each other within a predetermined specified distance. In such a configuration, if the loading processing is executed concurrently in the loading sections 3 located close to each other, there may be cases where the identification information (article ID) recorded in the wireless tag 9 of the loading target article 8L on one loading section 3 is read by the wireless tag reader 34 provided on another loading section 3. Accordingly, in such cases, preferably, matching determination is executed between the identification information read in the reading processing and the identification information of the articles 8 recorded in the stored article database 72, and then, as necessary (that is, if they do not match each other), different periods of delay of recording in the stored article database 72 are set (that is to say, configuration is made in a manner such that one period is ended, and then another period starts).

(8) The foregoing embodiment has described, as an example, a configuration in which if it is determined in the matching determination that "there is no matching information", the identification information of the loading target article 8L read in the reading processing is recorded in the stored article database 72. However, the present invention is not limited to this configuration, and a configuration is also possible in which the identification information of the loading target article 8L is recorded in the stored article database 72, only when, in addition to the determination of "there is no matching information", another condition is met. Examples of "another condition" in this case include "weight is less than or equal to a predetermined standard weight" and "size is less than or equal to a predetermined standard size".

(9) The foregoing embodiment has described, as an example, a configuration in which the control system that controls the automated warehouse 1 includes the upper-level controller C, the control unit 6, and the recording unit 7 that are communicably connected to each other. However, the present invention is not limited to this configuration, and, for example, a control apparatus included in the automated warehouse 1 may have the functions of some or all of the upper-level controller C, the control unit 6, and the recording unit 7 in an integrated manner. Alternatively, at least portions of the upper-level controller C, the control unit 6, and the recording unit 7 may further be segmented, and the segments may be communicably connected to each other.

(10) The foregoing embodiment has described, as an example, a configuration in which, as the loading processing, processing of reading the identification information of the loading target article 8L and processing of recording the identification information of the loading target article 8L in the stored article database 72 are performed. However, the present invention is not limited to this configuration, and, as the loading processing, for example, processing of measuring the weight of the loading target article 8L (weight measurement processing), processing of checking the state of the loading target article 8L (inspection processing), and the like may further be performed.

(11) The foregoing embodiment has described, as an example, a configuration in which, as the unloading processing, processing of deleting the identification information of an article 8 (unloading target article) to be discharged from the storage rack 2, from the stored article database 72 is performed. However, the present invention is not limited to this configuration, and, for example, processing of reading the identification information of the unloading target article (second reading processing), processing of measuring the weight of the unloading target article (second weight measurement processing), processing of checking the state of the unloading target article (second inspection processing), and the like may further be performed as the unloading processing.

(12) The foregoing embodiment has described, as an example, a configuration in which a wireless tag 9 is attached to each of the pallet 81 and a plurality of loads 82 constituting the article 8. However, the present invention is not limited to this configuration, and a wireless tag 9 may be attached to only a representative part of the article 8 (such as, for example, only the pallet 81 or only one of the loads 82).

(13) The foregoing embodiment has described, as an example, a configuration in which the loading section 3 and the unloading section 4 are provided independently. However, the present invention is not limited to this configuration, and a unit may be used as the loading section 3 and the unloading section 4. In a case where two loading sections and two unloading sections 4 are provided as in the above-described embodiment, a unit may be used as at least one of the pair of the first loading section 3A and the first unloading section 4A, and the pair of the second loading section 3B and the second unloading section 4B.

(14) The foregoing embodiment has described, as an example, a configuration in which the transport apparatus 5 is configured as a stacker crane. However, the present invention is not limited to this configuration, and a combination of, for example, a conveyor, a lifter, a shuttle and the like may be used as the transport apparatus 5, as long as it is an apparatus that transports at least an article 8. Alternatively, a transport vehicle of various types such as, for example, a high-speed sorting carriage with track or an unmanned transport vehicle may be used as the transport apparatus 5.

(15) The configurations disclosed in the above-described embodiments (including the above-described embodiments and other embodiments; the same applies below) can be applied in combination with configurations disclosed in other embodiments as long as no contradiction arises. Regarding other configurations, the embodiments disclosed in the present specification are merely examples in all respects, and various modifications can be made as appropriate without departing from the spirit of the present disclosure.

Overview of Embodiments

In summary, the automated warehouse according to the present disclosure preferably includes the following configurations:

An automated warehouse includes:

a storage rack including a plurality of storage sections capable of storing articles;

at least one loading section where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, wherein each of the articles includes a wireless tag in which identification information unique to the article is recorded, the loading section includes a wireless tag reader configured to read the wireless tag, the loading processing includes reading processing of reading, with the wireless tag reader, the identification information recorded in the wireless tag of the loading target article, the automated warehouse further comprises a recording unit in which the identification information of the articles is recorded, and in the loading processing, in response to the identification information read in the reading processing not matching any recorded identification information of other articles already recorded in the recording unit, the control unit records the identification information read in the reading processing as the identification information of the loading target article in the recording unit.

With this configuration, even if, for example, the loading section and the storage section are located at a short distance, and the wireless tag reader installed in the loading section mistakenly reads the identification information recorded in the wireless tag of an article stored in the storage section, instead of the loading target article, it is possible to avoid the false identification information from being recorded as the identification information of the loading target article. That is to say, a simple method of performing filtering by comparing the identification information with the recorded identification information already recorded in the recording unit can be used to record the true identification information of the loading target article. Accordingly, it is possible to realize an automated warehouse that can accurately manage stored articles with a simple configuration.

As an aspect, preferably, in the loading processing, in response to the identification information read in the reading processing matching any of the recorded identification information, the control unit interrupts the loading processing and issues an abnormality notification.

With this configuration, if the wireless tag reader mistakenly reads identification information recorded in a wireless tag of an article that is stored in the storage section and is different from the identification information of the loading target article, it is possible to notify an operator of an occurrence of misreading and prompt the operator to correct the mistake. Accordingly, it is possible to manage the stored article more accurately.

As an aspect, preferably, the automated warehouse further includes:

an unloading section where unloading processing, in which an unloading target article among the articles is unloaded from the storage rack, is performable, wherein the control unit disables the identification information of the unloading target article that is recorded in the recording unit, upon completion of the unloading processing performed on the unloading target article.

With this configuration, if an article to which the same identification information is attached as that of an article unloaded in the past is to be loaded again, it is possible to avoid such a situation in which it is mistakenly determined that misreading has occurred, regardless of the reading processing having actually been correctly performed.

As an aspect, preferably, the at least one loading section includes a plurality of the loading sections, the plurality of loading sections include a nearby loading section located at a distance less than a predetermined specified distance from any one of the storage sections, and a distant loading section located at a distance greater than or equal to the specified distance from all of the storage sections, and in the loading processing that is executed in the nearby loading section, the control unit determines whether or not the identification information read in the reading processing matches any of the recorded identification information.

With this configuration, in the loading processing executed in the nearby loading section, which is located close to any one of the storage sections and has a relative high likelihood of misreading, it is possible to appropriately avoid false identification information from being recorded as the identification information of the loading target article.

As an aspect, preferably, in the loading processing executed in the distant loading section, after the reading processing, the control unit regards the identification information read in the reading processing as not matching any of the recorded identification information, and records as-is the identification information read in the reading processing, as the identification information of the loading target article, in the recording unit.

With this configuration, in the loading processing executed in the distant loading section, which is located away from any one of the storage sections and has relative low likelihood of misreading, the identification information read in the reading processing is recorded as-is, and thus it is possible to achieve a reduction in processing load of the arithmetic operation while hardly deteriorating the accuracy of the identification information of the loading target article.

As an aspect, preferably, the specified distance is a value greater than a maximum value of a communicable distance between the wireless tag and the wireless tag reader.

With this configuration, when the loading processing is executed in any one of the loading sections, appropriate settings can be made when it is determined whether or not the read identification information matches any of the recorded identification information and whether or not to record the read identification information.

As an aspect, preferably, the nearby loading section is provided in an area adjacent to at least one of the storage sections, inside the storage rack.

With this configuration, in the loading processing executed in the nearby loading section, which is located at an area adjacent to at least one of the storage sections and has relative high likelihood of misreading, it is possible to accurately avoid false identification information from being recorded as the identification information of the loading target article.

As an aspect, preferably, the at least one loading section includes a plurality of the loading sections, and in a case where two or more of the loading sections are provided within a predetermined specified distance from each other, and the loading processing is executed in the two or more loading sections concurrently, the control unit determines whether or not the pieces of identification information read in the reading processing match any of the recorded identification information, and then, as necessary, sets different periods of delay of recording in the recording unit for the pieces of identification information.

With this configuration, even if, in reading processing executed concurrently in a plurality of loading sections within the specified distance, the same identification information is read concurrently by misreading in at least one loading section, the former determination result can be used for the latter determination. Accordingly, even in such a case, it is possible to avoid false identification information from being recorded as the identification information of the loading target article.

As an aspect, preferably, the recording unit has recorded therein position information indicating positions of the articles already stored in the storage rack, in association with the identification information of the articles, and in the loading processing, the control unit regards the identification information of an article located at a distance less than a predetermined specified distance from the loading section as the recorded identification information, and determines whether or not the identification information read in the reading processing matches any of the recorded identification information.

With this configuration, by limiting comparison targets in the recorded identification information that are to be used for matching determination with the read identification information to identification information of articles located at distances less than the specified distance from the loading section, it is possible to achieve a reduction in processing load of the arithmetic operation.

As an aspect, preferably, the recording unit includes a stored article database in which the identification information of each article already stored in the storage rack is recorded, and a buffer memory configured to temporarily record information, the control unit temporarily records the identification information read in the reading processing in the buffer memory, and, in response to the loading target article having been stored in any one of the storage sections, the control unit records the temporarily recorded identification information in the stored article database, and in loading processing performed on a new loading target article, the control unit regards a combination of the identification information recorded in the stored article database and the identification information temporarily recorded in the buffer memory as the recorded identification information, and determines whether or not the identification information read in the reading processing matches any of the recorded identification information.

With this configuration, by adding identification information of an article that was subjected to the loading processing including the reading processing but is still being transported without having been completely stored in any one of the storage sections to comparison targets to be used for matching determination of identification information read with respect to another loading target article, it is possible to reduce the likelihood that false identification information is recorded as the identification information of the loading target article.

It is sufficient for the automated warehouse according to the present disclosure to be able to realize at least one of the above-described effects.

What is claimed is:

1. An automated warehouse comprising:

a storage rack comprising a plurality of storage sections capable of storing articles;

at least one loading section where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, the loading section comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, in the loading processing, in response to the identification information read in the reading processing not matching any recorded identification information of other articles already recorded in the recording unit, the control unit records the identification information read in the reading processing as the identification information of the loading target article in the recording unit, and in the in the loading processing, in response to the identification information read in the reading processing matching any of the recorded identification information, the control unit interrupts the loading processing and issues an abnormality notification.

2. An automated warehouse comprising:

a storage rack comprising a plurality of storage sections capable of storing articles;

at least one loading section where loading processing, in which a loading target article among the articles is loaded to the storage rack, is performable;

an unloading section where unloading processing, in which an unloading target article among the articles is unloaded from the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, the loading section comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, in the loading processing, in response to the identification information read in the reading processing not matching any recorded identification information of other articles already recorded in the recording unit, the control unit records the identification information read in the reading processing as the identification information of the loading target article in the recording unit, and the control unit disables the identification information of the unloading target article that is recorded in the recording unit, upon completion of the unloading processing performed on the unloading target article.

3. An automated warehouse comprising:

a storage rack comprising a plurality of storage sections capable of storing articles;

a plurality of loading sections where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, each of the loading sections comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, the plurality of loading sections comprise a nearby loading section located at a distance less than a predetermined specified distance from any one of the storage sections, and a distant loading section located at a distance greater than or equal to the specified distance from all of the storage sections, in the loading processing, in response to the identification information read in the reading processing not matching any recorded identification information of other articles already recorded in the recording unit, the control unit records the identification information read in the reading processing as the identification information of the loading target article in the recording unit, and in the loading processing that is executed in the nearby loading section, the control unit determines whether or not the identification information read in the reading processing matches any of the recorded identification information.

4. The automated warehouse according to claim 3, wherein, in the loading processing executed in the distant loading section, after the reading processing, the control unit regards the identification information read in the reading processing as not matching any of the recorded identification information, and records the identification information read in the reading processing, as the identification information of the loading target article, in the recording unit.

5. The automated warehouse according to claim 3, wherein the specified distance is a value greater than a maximum value of a communicable distance between the wireless tag and the wireless tag reader.

6. The automated warehouse according to claim 3, wherein the nearby loading section is provided in an area adjacent to at least one of the storage sections, inside the storage rack.

7. An automated warehouse comprising:

a storage rack comprising a plurality of storage sections capable of storing articles;

a plurality of loading sections where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, each of the loading sections comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, in the loading processing, in response to the identification information read in the reading processing not matching any recorded identification information of other articles already recorded in the recording unit, the control unit records the identification information read in the reading processing as the identification information of the loading target article in the recording unit, and in a case where two or more of the loading sections are provided within a predetermined specified distance from each other, and the loading processing is executed in the two or more loading sections concurrently, the control unit determines whether or not the pieces of identification information read in the reading processing match any of the recorded identification information, and then, as necessary, sets different periods of delay of recording in the recording unit for the pieces of identification information.

8. An automated warehouse comprising:

a storage rack comprising a plurality of storage sections capable of storing articles;

at least one loading section where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, the loading section comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, in the loading processing, in response to the identification information read in the reading processing not matching any recorded identification information of other articles already recorded in the recording unit, the control unit records the identification information read in the reading processing as the identification information of the loading target article in the recording unit, the recording unit has recorded therein position information indicating positions of the articles already stored in the storage rack, in association with the identification information of the articles, and in the loading processing, furthermore, the control unit regards the identification information of an article located at a distance less than a predetermined specified distance from the loading section as the recorded identification information, and determines whether or not the identification information read in the reading processing matches any of the recorded identification information.

9. An automated warehouse comprising:

a storage rack comprising a plurality of storage sections capable of storing articles;

at least one loading section where loading processing, in which a loading target article among the articles is loaded to the storage rack, is performable;

a transport apparatus configured to transport the loading target article from the loading section to any one of the storage sections; and a control unit configured to perform the loading processing and control the transport apparatus, and wherein:

each of the articles comprises a wireless tag in which identification information unique to the article is recorded, the loading section comprises a wireless tag reader configured to read the wireless tag, the loading processing comprises reading processing of reading, with the wireless tag reader, the identification information recorded in the wireless tag of the loading target article, the automated warehouse further comprises a recording unit in which the identification information of the articles is recorded, in the loading processing, in response to the identification information read in the reading processing not matching any recorded identification information of other articles already recorded in the recording unit, the control unit records the identification information read in the reading processing as the identification information of the loading target article in the recording unit, the recording unit comprises a stored article database in which the identification information of each article already stored in the storage rack is recorded, and a buffer memory configured to temporarily record information, and the control unit temporarily records the identification information read in the reading processing in the buffer memory, and, in response to the loading target article having been stored in any one of the storage sections, the control unit records the temporarily recorded identification information in the stored article database, and in loading processing performed on a new loading target article, the control unit regards a combination of the identification information recorded in the stored article database and the identification information temporarily recorded in the buffer memory as the recorded identification information, and determines whether or not the identification information read in the reading processing matches any of the recorded identification information.

* * * * *